July 14, 1970 L. HITCHCOCK 3,520,379
COUPLING TYPE GREASE GUN FEED UNIT
Filed Sept. 16, 1968
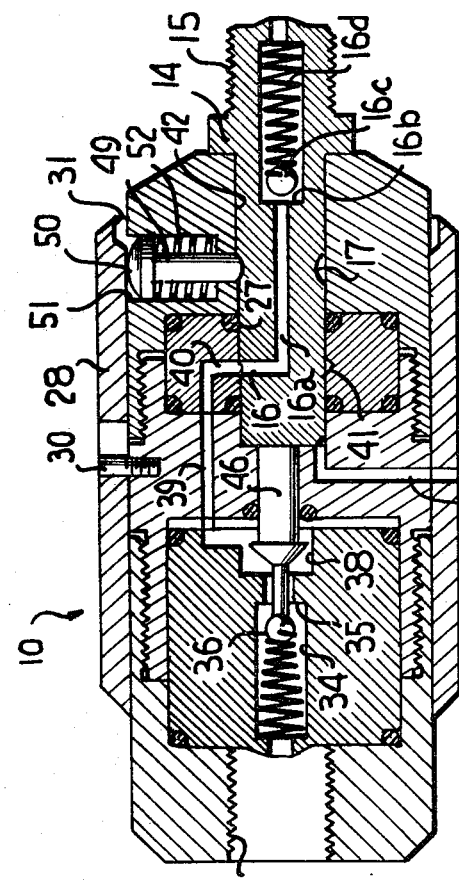
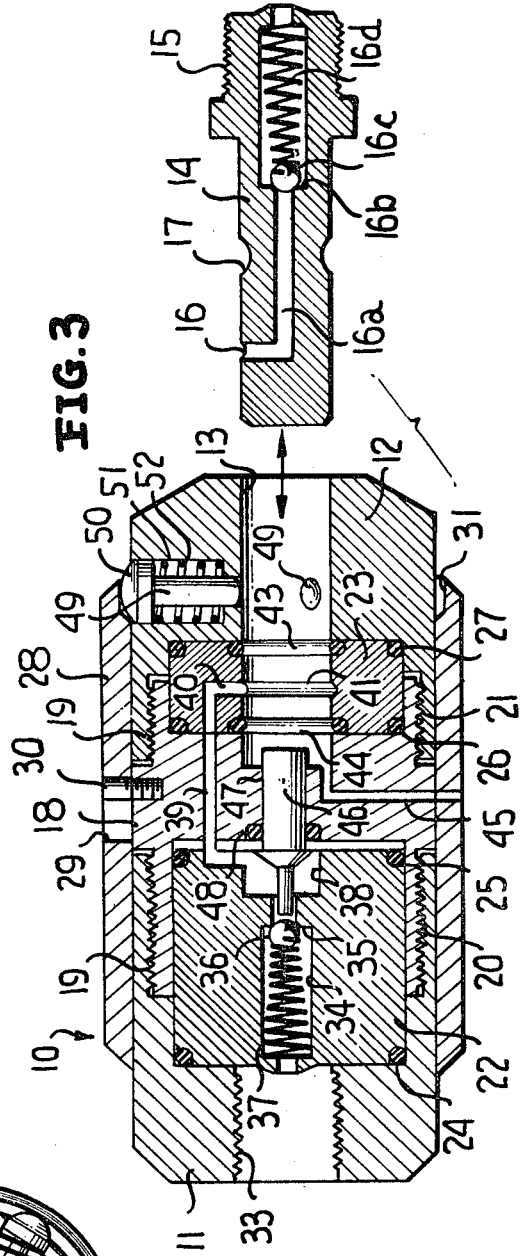
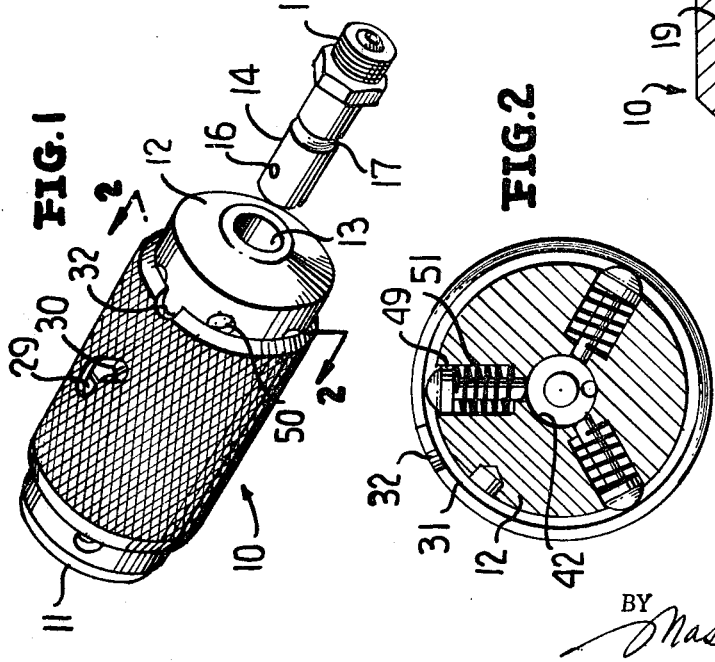
INVENTOR
LLOYD HITCHCOCK
BY Mason Porter, Willard Brown
ATTORNEYS United States Patent Office 3,520,379
Patented July 14, 1970

3,520,379
COUPLING TYPE GREASE GUN FEED UNIT
Lloyd Hitchcock, 1648 E. Belvedere Ave.,
Baltimore, Md. 21212
Filed Sept. 16, 1968, Ser. No. 759,869
Int. Cl. F16n 3/10
U.S. Cl. 184—105                7 Claims

ABSTRACT OF THE DISCLOSURE

A feed unit for use with a pressurized grease gun, the feed unit having features wherein the gun is inoperable unless fully connected and locked onto a grease fitting. The insertion of a grease fitting into an open end of the feed unit unseats a ball check valve and thereby permits grease under pressure to flow through the unit. The use of O-ring seals eliminates seepage of grease during use and prevents a residue of grease from building up within the open end of the unit following use. The O-ring seals act to wipe the surface of the grease fitting upon its withdrawal from the open end of the unit.

---

This invention relates to coupling devices and, more particularly, to a feed unit for use with hand or power operated grease guns and having features such that the gun is inoperable unless the unit is fully and positively locked on a grease fitting.

Grease gun feed units are conventionally used to provide a coupling between a hand or power operated grease gun and a Zerk-type grease fitting on a machine being greased. The unit usually has a ball check valve held against a seat by spring pressure to prevent flow of grease through the unit when no pressure is exerted by the grease gun. However, when pressure is applied by the gun, grease flows through the unit freely. This means that grease may be dispensed from the gun even when the unit is not connected to a grease fitting on a machine. Consequently, large quantities of grease are sometimes forced out of the unit even before it is engaged with the grease fitting on the machine being greased. Moreover, loss of grease is quite often experienced when engaging and disengaging the unit from the grease fitting. This extra or surplus grease forced out of the unit unintentionally and left on or around the grease fitting is necessarily wasted and obviously causes a mess which is very undesirable, both from an economical and sanitary point of view.

Another undesirable feature of the conventional type feed unit is that the open or contact end of the unit is always filled with grease. This means that as the grease fitting is inserted into the feed unit it is completely covered with grease even before pressure is exerted by the grease gun. This excess grease, instead of passing through the grease fitting and into the machine intended to be greased, remains on the outer part of the fitting and is necessarily wasted and requires a cleaning job.

A further loss of grease and accompanying messy conditions resulting from use of the conventional type of feed unit are occasioned when greasing is being accomplished with a hand operated gun. In the use of such a gun, when the operator decides that a machine has received the proper amount of grease, the unit may be disengaged from the grease fitting when the gunhandle is only partly down or the pressure stroke only partially completed. In this event, to facilitate a more efficient or convenient transfer to engage the gun onto another grease fitting, there is a tendency to complete the downward stroke of the handle on the gun after the unit has been disengaged from the fitting. This forces more grease out of the unit which is necessarily wasted and obviously creates an additional mess that must be cleaned off. This same result can occur if the unit is used on a power operated gun should the unit be disengaged from the grease fitting before the power operating the gun is shut off.

From the foregoing it should be readily apparent that a greasing operation using the conventional type of feed unit necessarily involves a considerable amount of wasted grease as well as an inestimable amount of time and labor required to clean the resulting mess. This problem is further magnified when the machine being greased is used in food processing or other types of operations wherein cleanliness and sanitation are of the utmost concern.

It is, therefore, a primary object of this invention to provide a feed unit for use with a pressurized grease gun which will prevent waste of grease and also leave all grease fittings clean and free of surplus grease.

More particularly, it is an object of this invention to provide a feed unit that renders a grease gun inoperable unless fully and positively locked to a grease fitting, and which will prevent the flow of grease, regardless of the pressure applied, unless it is so locked.

Another object of this invention is to provide a feed unit having seal means to prevent the leakage of grease along the outer part of a grease fitting and also to wipe the fitting clean upon its withdrawal from the unit.

A further cause for a leakage of grease in the conventional type feed unit is its snap-on arrangement or contact lock which tends to hold the unit in contact with the grease fitting on the machine being greased. This action is dependent upon spring action incorporated into the unit. As the unit is forced onto a grease fitting, the spring tension tends to hold the unit in contact with the fitting while the greasing is being accomplished. However, there is quite frequently a leakage or seepage at the contact point, particularly if the gun position is at all unity. It is, therefore, another object of this invention to provide a feed unit having a snap-on feature which provides a positive lock with a grease fitting.

More particularly, it is an object of this invention to provide a feed unit having a plruality of pins spaced about its periphery and resiliently biased radially outwardly thereof, which pins are adapted to be set in interlocking engagement with a grease fitting to thereby positively lock the feed unit on the grease fitting.

Another object of this invention is to provide in a feed unit or other cylindrical body novel means for facilitating the positioning of spring biased pins about its periphery upon assembly of the unit.

With the above and the other objects in view that will hereinafter appear, the nature of the invention will be more clearly understood by reference to the following detailed description, the appended claimed subject matter and the several views illustrated in the accompanying drawing:

In the drawings:

FIG. 1 is a perspective view of a feed unit formed in accordance with this invention and a grease fitting adapted to be inserted therein.

FIG. 2 is a sectional view taken along line 2—2 of FIG. 1.

FIG. 3 is a vertical sectional view of the feed unit and a grease fitting prior to insertion therein.

FIG. 4 is a vertical sectional view of the feed unit similar to FIG. 3 but with the grease fitting inserted therein and showing the check valve open to permit the flow of grease therethrough.

Referring now to the drawings in detail, there is seen illustrated in FIG. 1 a feed unit formed in accordance with this invention and referred to generally by the numeral 10. The feed unit 10 has one end 11 adapted to be connected to a grease gun (not shown) and another end 12 having an opening 13 adapted to receive a grease fitting 14. The grease fitting 14 has a threaded portion 15 by which it is connected to a machine (not shown) intended to be greased. The grease fitting 14 further includes an inlet port 16 which communicates through a passage 16a with the machine. The passage 16a includes a shoulder 16b which serves as a seat for a ball valve 16c. The ball valve 16c is biased against the seat 16b by a spring 16d. The grease fitting 14 also includes a peripheral groove 17 by which it is interlocked with the feed unit 10.

Referring now to FIG. 3 in particular, it can be seen that the feed unit 10 includes an intermediate portion 18 having external threads 19 at both ends for engagement with internal threads 20 and 21 on the ends 11 and 12 respectively. A disc 22 is positioned between opposing portions of the intermediate portion 18 and the end 11, and a disc 23 is positioned between opposing portions of the intermediate portion 18 and the end 12. The disc 22 includes O-rings 24 and 25 positioned about its periphery and the disc 23 includes O-rings 26 and 27 positioned about its periphery. The feed unit 10 further includes a sleeve 28 having a dog-leg slot 29 formed in its wall and is mounted for limited axial and rotational movement as determined by the engagement of the slot 29 with a set screw 30 set in the intermediate portion 18. The sleeve 28 further includes an undercut end 31 having a notch 32 (see FIG. 1) the purpose of which will be explained hereinafter.

The end 11 includes a threaded bore 33 by which the feed unit 10 is connected to a grease gun (not shown) which communicates with the bore 34 formed in the disc 22. The bore 34 terminates in a necked-down portion 35 which serves as a seat for a ball valve 36. The ball valve 36 is resiliently biased against the seat 35 by a spring 37. A plunger 46 mounted in a bore 47 in the intermediate portion 18 and sealed by an O-ring 48 is adapted to move the ball valve 36 off its seat 35 in a manner to be described hereinafter. The disc 22 further includes a chamber 38 in communication with the bore 34 which opens into a passage 39 which extends through the intermediate portion 18 and the disc 23. The passage 39 terminates in a radially extending outlet port 40 which communicates through an annular groove 41 with the opening or bore 13 formed through the end 12, the disc 23 and partly through the intermediate portion 18. The opening 13 is adapted to receive the grease fitting 14. O-rings 43 and 44 are positioned in annular grooves on each side of the annular groove 41. The opening 13 communicates with an air vent 45 extending through the intermediate portion 18 and the sleeve 28.

A plurality of pins 49 having enlarged rounded head portions 50 are set in radially extending holes 51 in the periphery of the end 12 which extend through the interior of the opening 13. The pins 49 are resiliently biased outwardly by means of springs 52 and are retained in the holes 51 by the undercut end 31 of the sleeve 28. When the sleeve 28 is in the position as shown in FIG. 3, the pins 49 do not extend into the exterior of the opening 13. However, when the sleeve 28 is moved axially to the right as seen in FIG. 4, it rides over the rounded heads 50 of the pins 49 and forces them inwardly into the opening 13 for engagement with the groove 17 of a grease fitting 14 which has been positioned therein.

In operation, when the feed unit 10 is connected to a grease gun by means of the threads 33, the grease under pressure will tend to keep the ball valve 36 closed against the seat 35. No grease can flow regardless of the pressure applied. When it is desired to grease a machine to which the grease fitting 14 is connected, the feed unit 10 is brought into engagement with the grease fitting 14 with the fitting 14 received in the opening 13. The fitting 14 is inserted in the opening 13 until it engages the plunger 46. Continued insertion of the fitting 14 will push the plunger 46 to the left as seen in FIG. 4 and unseat the ball valve 36 from its seat 35 and permit the flow of grease through the passage 39. At this point, the inlet port 16 of the grease fitting 14 will be aligned with the annular groove 41 which is in communication with the outlet port 40 of the passage 39. Also at this point, the peripheral groove 17 in the grease fitting 14 will be aligned with the pins 49 so that movement of the sleeve 28 to the right as seen in FIG. 4 will force the pins 49 inwardly into interlocking engagement with the groove 17. Because of the dog-leg shape of the slot 29, a camming effect is provided between the slot 29 and the set screw 30 whereby the sleeve 28 can be pushed axially forward by the operator and simultaneously rotated into a locked position.

As seen most clearly in FIG. 4, grease under pressure will flow through the bore 34, past the open check valve 36, into the chamber 38, through the passage 39, out through the port 40, into the inlet port 16 of the grease fitting 14, through the passage 16a, force open the ball check valve 16c against the pressure of the spring 16d and then flow into the machine to be greased. When the machine has received a sufficient amount of grease, the sleeve 28 is simply moved axially to the left as seen in FIG. 4 to thereby allow the springs 52 to pop the pins 49 outwardly out of engagement with the groove 17 so that the feed unit 10 can be withdrawn from engagement with the grease fitting 14. As soon as the feed unit 10 begins moving towards the left as seen in FIG. 4, and the grease fitting 14 disengages from the plunger 46, the check valve 36 will be forced back against its seat 35 and thereby cut off the flow of grease. No grease will flow into the opening 13 after the grease fitting 14 is removed. As the grease fitting 14 is withdrawn from the opening 13 the O-rings 43 and 44 will wipe the outer periphery of the grease fitting 14 clean. The result is a clean grease fitting and a substantially greaseless opening which is ready to receive the next grease fitting. It should be noted that the provision of the air vent 45 permits easy insertion and withdrawal of the grease fitting 14 which would not otherwise occur because of a suction effect that would be present in the opening 13.

Another feature of this invention is the novel means for facilitating insertion of the pins 49 in the holes 51 upon assembly of the feed unit 10. The notch 32 is first aligned with one of the holes 51. A pin 49 and a spring 52 are then inserted through the notch 32 into the hole 51. The sleeve 28 is then rotated so that its undercut portion 31 passes over the inserted pin 49 and retains it in position against the upward force of the spring 52. The sleeve 28 is then rotated until the notch 32 comes into alignment with the next hole 51. The corresponding pin 49 is then inserted in the same manner as the previous pin and the sleeve 28 is again rotated with its undercut portion 31 now retaining both pins 49 in position. This procedure is repeated until all the pins 49 have been inserted in their respective holes. At that point the set screw 30 is inserted through the slot 29 into the intermediate portion 18 so that the extent of the axial and rotational movement of the sleeve 28 is limited and the pins 49 retained thereunder.

From the foregoing, it should be readily apparent that there has been disclosed a novel feed unit for use with a pressurized grease gun which is both easily assembled and economical in use, both from the standpoint of grease saved and the cost of time and labor usually spent in cleaning up excess grease left around machinery and grease fittings dispensed from grease guns using the conventional type of feed unit. The feed unit embodies several features which mitigate against the loss of grease. First of all, as described above, the feed unit is totally inoperable unless fully and positively locked to a grease fitting. Secondly, the feed unit provides novel sealing means which surround the transfer point between the feed unit outlet port and the grease fitting inlet port and act to prevent the seepage of grease along the outer periphery of the grease fitting. Moreover, the sealing means serve to wipe the grease fitting clean upon withdrawal of the fitting from the unit. Another feature which provides a tight interlock between the unit and a grease fitting is the provision whereby the grease enters the fitting in a radial direction and not in an axial direction which would tend to force the fitting outwardly from engagement with the unit. These and other features described above cooperate to provide a novel feed unit which prevents waste of grease and leaves all grease fittings free of surplus grease.

Although only a preferred embodiment of the invention has been specifically illustrated and described herein, it is to be understood that minor variations may be made without departing from the spirit of the invention.

I claim:

1. A feed unit for use with a pressurized grease gun, said feed unit comprising a body having one end adapted to be connected to a grease gun, an opening formed in said body for receiving a grease fitting, a passage through said body connecting said one end with said opening, said passage terminating in a port which opens into said opening from a side thereof, sealing means disposed in said opening on each side of said port for preventing leakage of grease, valve means closing said passage, and means operable only upon the insertion of a grease fitting into said opening for actuating said valve means to open said passage and thereby permit the flow of grease therethrough.

2. The feed unit of claim 1 wherein said opening is defined by an internal cylindrical wall in said body, an annular groove formed in said wall communicating with said port, said sealing means comprising spaced O-rings set in said wall on each side of said annular groove.

3. The feed unit of claim 2 wherein said opening is adapted to receive a grease fitting having an inlet port so positioned in its periphery such that it will be aligned with said annular groove upon the actuation of said valve means.

4. The feed unit of claim 1 including means for locking said feed unit on a grease fitting.

5. The feed unit of claim 4 wherein said means for locking includes pin means mounted in said body transversely of said opening, said pin means being spring biased outwardly of said body, a sleeve carried by said body and slidable axially thereof, said sleeve being adapted to engage said pin means and force them inwardly into said opening for interlocking engagement with a grease fitting, and means for locking said sleeve relative to said body for maintaining said interlocking engagement.

6. The feed unit of claim 1 including vent means located at an innermost portion of said opening for providing fluid communication between said opening and the atmospherer.

7. A cylindrical body having a plurality of pins mounted in holes in its periphery, spring means for biasing said pins radially outwardly of said body, a sleeve telescoped over said body and axially slidable and rotatable thereon, said sleeve having an undercut end for fitting over said pins and retaining them in said body, and said sleeve further having a notch formed in said undercut end for receiving said pins in said body by sequentially aligning said notch with each of said holes and inserting said pins through said notch into said holes, said sleeve being rotatable relative to said body for aligning said notch with the next of said holes while the previously set pins are retained under said undercut end.

References Cited

UNITED STATES PATENTS

| | | |
|---|---|---|
| 1,343,819 | 6/1920 | Grenci. |
| 1,383,306 | 7/1921 | Jacques. |
| 1,637,325 | 7/1927 | Jacques. |
| 1,985,963 | 1/1935 | Walker _____ 184—105 XR |
| 3,291,152 | 12/1966 | Comer _____ 285—315 XR |

FOREIGN PATENTS 1,038,349    9/1958    Germany.

MANUEL A. ANTONAKAS, Primary Examiner

U.S. Cl. X.R.

285, 315